United States Patent [19]
Norsby et al.

[11] 3,914,456
[45] Oct. 21, 1975

[54] DRY MIX PUDDING COMPOSITION

[75] Inventors: Norrain E. Norsby, Hopkins; James R. Schultz, Minnetonka, both of Minn.

[73] Assignee: General Mills, Inc., Minneapolis, Minn.

[22] Filed: July 2, 1973

[21] Appl. No.: 376,065

[52] U.S. Cl. ............................................. 426/579
[51] Int. Cl.² .......................................... A23L 1/187
[58] Field of Search ................... 426/167, 215, 350

[56] References Cited
UNITED STATES PATENTS

| | | | |
|---|---|---|---|
| 2,607,692 | 8/1952 | Kennedy et al. | 426/167 |
| 2,801,924 | 8/1957 | Clausi | 426/167 |
| 2,829,978 | 4/1958 | Castagna et al. | 426/167 |
| 3,754,935 | 8/1973 | Glicksman et al. | 426/167 |

*Primary Examiner*—Jeanette M. Hunter
*Attorney, Agent, or Firm*—Gene O. Enockson; Elizabeth Tweedy

[57] ABSTRACT

Dry mix pudding composition comprising waxy maize corn and tapioca pregelatinized starches and alkali pyrophosphate, monocalcium phosphate and a potassium salt as setting salts.

4 Claims, No Drawings

DRY MIX PUDDING COMPOSITION

This invention relates to pudding dry mix compositions. More particularly, this invention relates to pudding dry mix compositions which, when combined with milk, will result in a pudding having characteristics similar to those of a cooked starch pudding.

Heretofore, milk puddings have been made using sucrose, various types of pregelatinized starches, and various combinations of setting salts. Typical combinations of setting salts have included: a tetraalkali metal pyrophosphate and an edible water soluble calcium salt; an alkali pyrophosphate and an alkali orthophosphate; and an edible pyrophosphate, an edible orthophosphate and an edible calcium salt. Some of the above combinations of setting salts produced puddings which developed rubberiness on standing. Other salt combinations produced puddings having slow setting times. All of the puddings suffer from observable syneresis upon standing.

The pudding dry mix composition of this invention comprises sucrose, a selected pregelatinized starch blend and selected setting salts. When mixed with cold milk, they produce puddings having very rapid setting times, substantially no syneresis, and which can be stored under refrigeration for several days with little or no development of rubberiness.

The sucrose component preferably comprises from about 70 to 88% by weight of the dry mix composition. The pregelatinized starch component preferably comprises from about 3 to 9% pregelatinized waxy maize corn starch by weight of the dry mix composition and about 11 to 19% pregelatinized tapioca starch by weight of the dry mix composition. The total amount of the pregelatinized starch blend in the dry mix composition is preferably about 16 to 24% by weight of the dry mix composition. The above blend of waxy maize corn and tapioca pregelatinized starches combined with selected setting salts and has been found to produce puddings which are particularly resistant to syneresis.

The setting salts useful in this invention are an alkali metal pyrophosphate, monocalcium phosphate and a potassium salt selected from potassium sulfate, potassium chloride and mixtures thereof. The above salts are preferably included in amounts of from about 0.30 to 3.00% alkali metal pyrophosphate by weight of the dry mix composition, about 0.75 to 1.25% monocalcium phosphate by weight of the dry mix composition, and about 0.05 to 1.00% potassium salt by weight of the dry mix composition. The alkali metal pyrophosphate and the monocalcium phosphate act as coagulants for the milk protein. The pyrophosphate is preferably tetrasodium pyrophosphate or tetrapotassium pyrophosphate. The potassium salt speeds solidification of the pudding, improves resistance to syneresis, and softens the otherwise tough gels formed when the phosphate salts are used as the sole setting agent.

Flavorings, seasonings, emulsifiers, and a small amount of shortening and the like can be added to the mixture to give the rehydrated mixture individual characteristics of a particular pudding. The emulsifier can react with starch or protein to improve the mouth feel. Sodium stearyl-2-lactylate produces an excellent mouthfeel and is the preferred emulsifier. Other emulifiers such as monoglycerides can be used if desired. The shortening smooths the mouthfeel of the pudding and can be a carrier for the emulsifier. To produce the best mouthfeel the shortening preferably has a Wiley melting point between about 90°F. and 110°F. Shortenings having lower melting points produce more liquid pudding and higher melting point shortenings tend to coat the mouth. In dry mix pudding compositions having optimum mouthfeel, shortening is included in amounts of from about 0.2 to 0.7% by weight of the dry mix composition and an emulsifier is included in amounts of about 0.2 to 0.7% by weight of the dry mix composition.

The dry mix compositions are made by dry blending the ingredients. The mixtures can be rehydrated by merely stirring with milk. The milk may be whole milk, skimmed milk or reconstituted dry milk. Typically about 125 g. of the above dry mix can be rehydrated in about 300 to 400 ml. of liquid. Particularly preferred for making fruit flavored pudding is rehydration of the dry mix in a mixture of milk and syrup from canned fruit. Usually heavy syrup used in canning fruit contains about 20% sugars and flavors extracted from the fruit. The extracted flavors add to the flavor quality of the pudding. When rehydrating with milk and heavy syrup, it is preferred to use about 1.5 to 2 parts by weight milk, about 0.75 to 1.5 parts by weight syrup from canned fruit to about 1 part by weight dry mix. When non-fruit flavored puddings are desired, i.e., chocolate or vanilla, rehydration in milk alone is preferred. Best results are obtained by vigorously beating the suspension of pudding ingredients in the liquid for about one minute before allowing the pudding to set.

Below are specific examples of the use and some of the properties of the dry mix pudding compositions of this invention.

EXAMPLE I

This example illustrates the lack of syneresis in the dry mix pudding compositions of the present invention and also sets out for comparative purposes the syneresis measurements observed from a typical commercially available dry mix pudding composition.

The dry mix pudding composition used in this illustration contained the following ingredients:

| Ingredient | Percent By Weight |
| --- | --- |
| Sucrose | 72.9980 |
| Pregelatinized tapioca starch | 15.7000 |
| Pregelatinized waxy maize corn starch | 6.0300 |
| Tetrasodium pyrosphosphate | 2.0700 |
| Monocalcium phosphate $(CaH_4(PO_4)_2 \cdot H_2O)$ | 0.7500 |
| Potassium sulfate | 0.7500 |
| Sodium chloride | 0.5600 |
| Vanilla | 0.4000 |
| Shortening | 0.3500 |
| Sodium stearyl-2-lactylate | 0.3500 |
| Color | 0.042 |
| | 100.0000 |

The typical commercially available dry mix pudding composition was labeled as containing the following ingredients: sugar, dextrose, modified tapioca starch, sodium phosphates, salt, hydrogenated vegetable oil, di- and mono-glycerides, artificial and natural flavors, non-fat dry milk, artificial flavors.

The two pudding mixes were made up by stirring 125 grams of each dry mix into 240 ml. of milk and 120 ml. of approximately 20% sugar fruit coctail syrup. After stirring the dry mixes into the liquid, the dispersions were beaten vigorously for a period of one minute with a wire whip. The resulting puddings were allowed to stand for ten minutes. At that point 200 gram samples of each pudding were placed in syneresis funnels equipped with sintered glass sieves and held in the funnels for a period of 23 hours. The results of the syneresis test is as follows:

Table 1

| Sample | Mls. of Liquid Recovered From | |
|---|---|---|
| | Present Pudding | Commercial Pudding |
| 1 | 0 | 1.25 |
| 2 | 0 | 0.75 |
| 3 | 0 | 0.75 |

The present pudding exhibited no observable syneresis. The commercial pudding did exhibit observable syneresis.

EXAMPLE II

This example illustrates the speed at which the viscosity of the above pudding compositions developed when the dry mixes were rehydrated as shown in Example I. After beating the rehydrated pudding compositions were placed immediately into a Bostwick Viscometer. The amount of flow of the respective samples was observed for a period of ten minutes and recorded in Bostwick units. The results are shown in Table 2.

Table 2

| Time | 1 min. | 3 min. | 5 min. | 10 min. |
|---|---|---|---|---|
| Present Pudding Composition | | | | |
| Sample No. 1 | 3.25 | 3.7 | 3.8 | 3.9 |
| Sample No. 2 | 3.10 | 3.3 | 3.3 | 3.4 |
| Commercial Pudding Composition | | | | |
| Sample No. 3 | 5.7 | 6.0 | 6.0 | 6.0 |
| Sample No. 4 | 5.8 | 5.9 | 5.9 | 5.9 |

As can be seen, the pudding compositions of the present invention exhibited less flow before solidifying than the commercial pudding composition.

EXAMPLE III

This example illustrates the effect of the potassium salt in the present pudding compositions.

Using the dry mix formulation shown in Example I, the following variations were made:

1. The potassium salt was omitted from the formulation;
2. potassium sulfate (0.75% by weight of the dry mix composition) was included in the formulation;
3. potassium chloride (0.75% by weight of the dry mix composition) was substituted for potassium sulfate in the formulation.

Samples were made up according to the procedure set out in Example I and allowed to stand for 10 minutes. The viscosity of the puddings was then measured with a Brookfield Viscometer equipped with a helipath using a B spindle rotating at 10 rpm. The results are shown in Table 3.

Table 3

| | Viscometer Readings Av. of Ten Readings Per Sample |
|---|---|
| Sample 1 above | 75 |
| Sample 1 above | 78 |
| Sample 2 above | 70 |
| Sample 2 above | 70 |
| Sample 3 above | 68 |
| Sample 3 above | 64 |

The data show the presence of a potassium salt reduces the viscosity of the pudding. In addition, organoleptic testing of the puddings indicated a greater tenderness in puddings containing potassium salt than in the puddings containing no potassium salt.

The embodiments of the invention in which an exclusive property or privilege is claimed are defined as follows:

1. A dry mix pudding composition comprising about 70 to 88% sucrose by weight of the dry mix composition, about 3 to 9% pregelatinized waxy maize corn starch by weight of the dry mix composition, about 11 to 19% pregelatinized tapioca starch by weight of the dry mix composition, the total amount of pregelatinized starch being about 16 to 24% by weight of the dry mix composition, and setting salts consisting essentially of an alkali metal pyrophosphate, monocalcium phosphate and a potassium salt selected from potassium sulfate and potassium chloride.

2. The dry mix pudding composition of claim 1 wherein the setting salts consist essentially of about 0.30 tp 3.00% alkali metal pyrophosphate by weight of the dry mix composition, about 0.75 to 1.25% monocalcium phosphate be weight of the dry mix composition and about 0.05 to 1.00% potassium salt by weight of the dry mix composition.

3. The dry mix pudding composition of claim 2 wherein a shortening having a Wiley melting point between about 90°F. and 110°F. is included in amounts of about 0.20 to 0.70% by weight of the dry mix composition and an emulsifier is included in amounts of about 0.20 to 0.70% by weight of the dry mix composition.

4. The dry mix pudding composition of claim 3 wherein the emulsifier is sodium stearyl-2-lactylate.

* * * * *

UNITED STATES PATENT OFFICE
CERTIFICATE OF CORRECTION

PATENT NO. : 3,914,456
DATED : October 21, 1975
INVENTOR(S) : Norrain E. Norsby and James R. Schultz It is certified that error appears in the above-identified patent and that said Letters Patent are hereby corrected as shown below:

Col. 1, line 38, "salts and has" should read ---salts has---.
Col. 4, line 43, "tp" should read ---to---; line 45, "be" should read ---by---.

Signed and Sealed this tenth Day of February 1976

[SEAL]

Attest:

RUTH C. MASON
Attesting Officer

C. MARSHALL DANN
Commissioner of Patents and Trademarks